United States Patent [19]

Moen

[11] Patent Number: 4,791,962

[45] Date of Patent: Dec. 20, 1988

[54] FLUID VALVE WITH PROTECTED VALVE CLOSING SEAL

[75] Inventor: Alfred M. Moen, Destin, Fla.

[73] Assignee: Stanadyne, Inc., Windsor, Conn.

[21] Appl. No.: 187,970

[22] Filed: Apr. 29, 1988

[51] Int. Cl.[4] .................................... F16K 11/078
[52] U.S. Cl. ............................ 137/625.17; 137/636.4; 137/625.4; 251/314; 251/304
[58] Field of Search ............ 137/625.17, 636.4, 625.4, 137/625.41; 251/304, 314, 900

[56] References Cited

U.S. PATENT DOCUMENTS

| | | | |
|---|---|---|---|
| 2,556,780 | 6/1951 | Shryock | 137/625.4 X |
| 3,103,231 | 9/1963 | Moen | 137/625.17 X |
| 3,285,278 | 11/1966 | Corlett | 137/625.17 X |
| 3,373,770 | 3/1968 | Ward et al. | 137/615 |
| 3,378,034 | 4/1968 | Andrews | 137/625.4 |
| 3,415,279 | 12/1968 | Bucknell et al. | 137/625.17 |
| 3,415,280 | 12/1968 | Bucknell et al. | 137/625.17 |
| 3,428,088 | 2/1969 | Bell | 137/625.17 |
| 3,456,677 | 7/1969 | Mongerson | 137/625.17 X |
| 3,568,719 | 3/1971 | Bonomi | 137/636.4 |
| 3,693,663 | 9/1972 | Tolnai et al. | 137/636.4 X |
| 3,726,317 | 4/1973 | Moen | 137/625.17 |
| 3,730,222 | 5/1973 | Moen | 137/625.17 |
| 3,840,048 | 10/1974 | Moen | 137/625.41 |
| 4,050,475 | 9/1977 | Watts | 137/625.17 |
| 4,305,419 | 12/1981 | Moen | 137/625.17 X |
| 4,330,011 | 5/1982 | Moen | 137/625.17 |
| 4,395,018 | 7/1983 | Moen | 251/900 X |
| 4,417,602 | 11/1983 | Moen | 137/625.17 |
| 4,469,121 | 9/1984 | Moen | 137/625.17 X |
| 4,628,962 | 12/1986 | Pezzarossi | 251/314 X |

Primary Examiner—John Rivell
Attorney, Agent, or Firm—Kinzer, Plyer, Dorn, McEachran & Jambor

[57] ABSTRACT

A fluid valve for use within a valve fixture such as a kitchen faucet, lavatory faucet or shower/tub control includes a body and a seal support positioned within the body and connected thereto. The seal support has an inlet and an outlet and the body has a discharge which is in alignment with the seal support outlet. There is an annular space defined between an interior wall of the body and an exterior wall of the seal support with there being a piston movable within this annular space and being in substantial contact with the interior wall of the body and the exterior wall of the seal support. The piston has an opening movable into alignment with the body discharge and the seal support outlet to provide a water passage from the seal support inlet to the discharge. There is a valve closing seal extending peripherally about the seal support outlet and in contact with the interior of the piston.

18 Claims, 2 Drawing Sheets

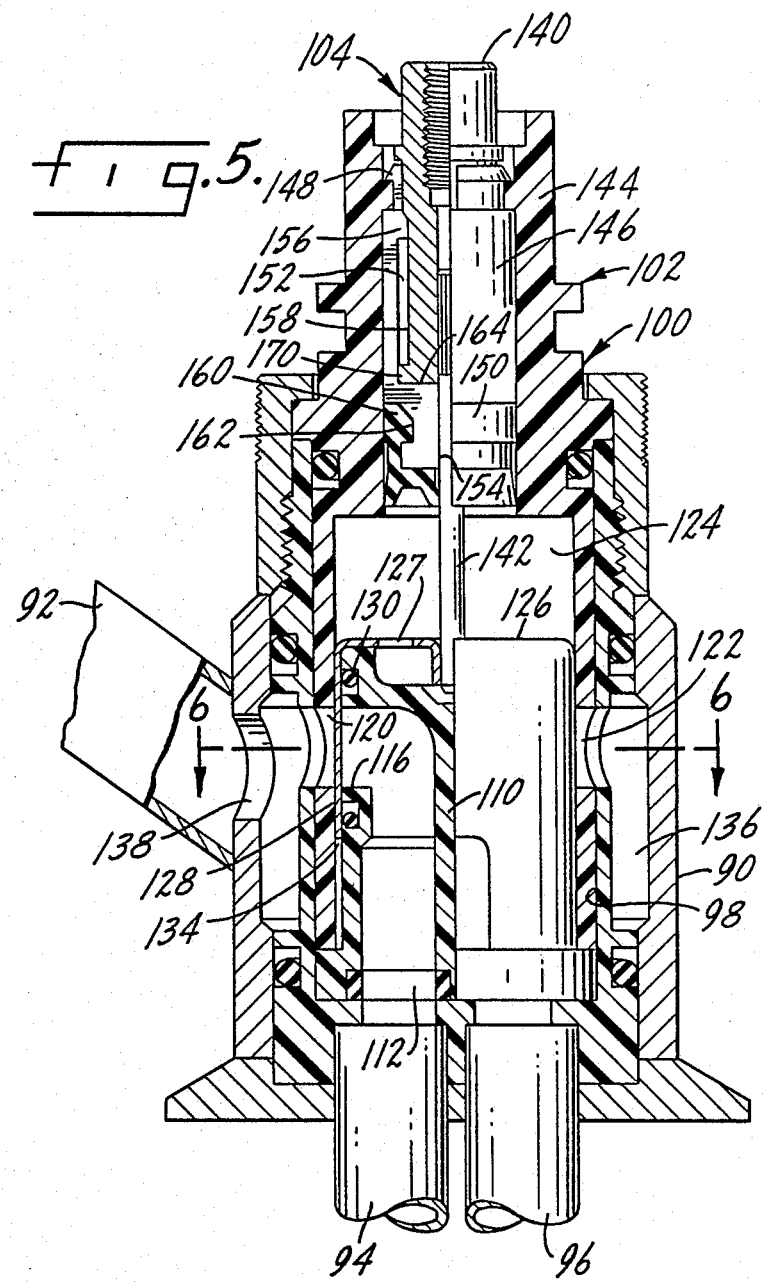
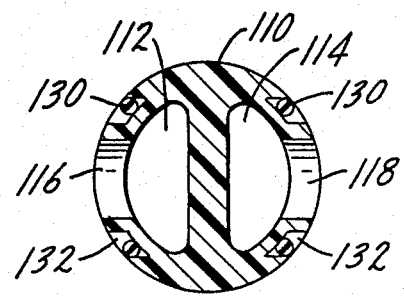

FLUID VALVE WITH PROTECTED VALVE CLOSING SEAL

SUMMARY OF THE INVENTION

The present invention relates to fluid valves of the type which are positioned within a valve fixture such as a kitchen faucet, lavatory faucet or shower/tub control and particularly relates to such a fluid valve, either a single lever mixing valve or a two handle faucet valve which provides protection for the valve closing seal.

A primary purpose of the invention is a valve structure for the use described which protects the valve closing seal from impurities in the water supply and from pressure differentials within the water discharge passage which can cause damaging movement of the seal.

Another purpose is a simply constructed, reliably operable fluid valve, suitable for use in either a mixing faucet or a two handle faucet, which utilizes a valve closing seal positioned about the valve discharge, but includes means to protect the seal to enhance the life of the valve.

Another purpose is a fluid valve construction utilizing a body, a seal support positioned within the body and defining a thin annular chamber with the body within which is positioned a rotatable piston which is effective both to control discharge from the valve and to protect the valve closing seal.

Another purpose is a valve construction of the type described in which the valve closing seal extends about the valve discharge, bu is positioned within a pocket or recess offset from the water passage so as to protect the seal from impurities in the water supply and damaging water pressures.

Other purposes will appear in the ensuing specification, drawings and claims.

BRIEF DESCRIPTION OF THE DRAWINGS

The invention is illustrated diagrammatically in the following drawings wherein:

FIG. 5 is an axial section illustrating the fluid valve of the present invention in a mixing valve fitting, and FIG. 6 is a section along plane 6—6 of FIG. 5.

DESCRIPTION OF THE PREFERRED EMBODIMENT

A faucet that leaks or drips from the faucet spout usually has a worn or defective valve closing seal. The problem can be corrected either by replacing the seal itself or, in the case of faucet cartridges manufactured by the Moen Group of Stanadyne, Inc., assignee of the present application, the faucet cartridge is replaced, providing an essentially new valve within the existing faucet housing. The research efforts of faucet manufacturers for some years have been directed toward protecting or insulating the valve closing seal from the problems that cause it to become worn or defective, principally impurities in the water supply and water pressures that cause damaging movement of the seal either causing the seal to be sucked out through the faucet spout or to be raised up from its seat to the point where it is cut or abraded by the moving valve member. My U.S. Pat. No. 4,395,018 shows a structure in which the valve closing seal is protected by removing it from the path of water flow through the valve.

The present invention relates to a fluid valve construction which is applicable to both single lever mixing faucets and to two lever faucets and is specifically directed to protecting the valve closing seal from impurities in the water supply and those pressure differentials which cause damaging movement of the seal.

The structure shown in Bucknell U.S. Pat. No. 3,415,280 has some similarity with the present valve construction, however, in Bucknell the seal was protected by a grate or grille at the piston opening, necessitated because the valve body was not directly adjacent the piston and the seal support within the piston. A grate or grille or series of crossed bars is not an advantageous structure in that it restricts water flow through the valve, creates a trap for dirt contributing to seal damage, and makes it difficult to accurately control temperature modulation of the water at the faucet discharge. The present invention provides a fluid valve which protects the valve closing seal as described, has no obstructions to the flow of water through the valve, either at the piston or at the valve body and seal support structures adjacent to the piston. The structure is usable in a two handle faucet such as shown in the above-mentioned U.S. Pat. No. 4,395,018 or in a single lever mixing faucet such as shown in my copending U.S. patent application Ser. No. 109,999, filed Oct. 19, 1987.

Figure 1:
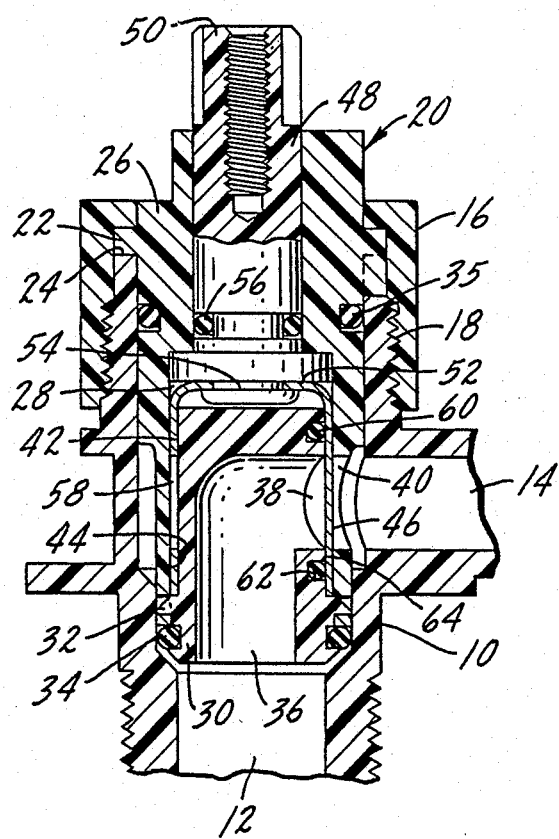
FIG. 1 is an axial section illustrating the fluid valve of the present invention in a two handle faucet fitting.
Figure 2:
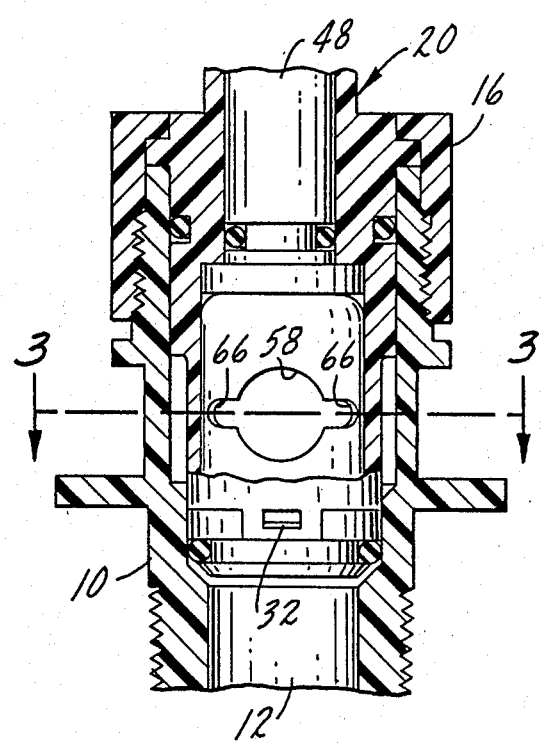
FIG. 2 is a side view of the valve of FIG. 1, with a portion of the valve body broken away.
Figure 3:
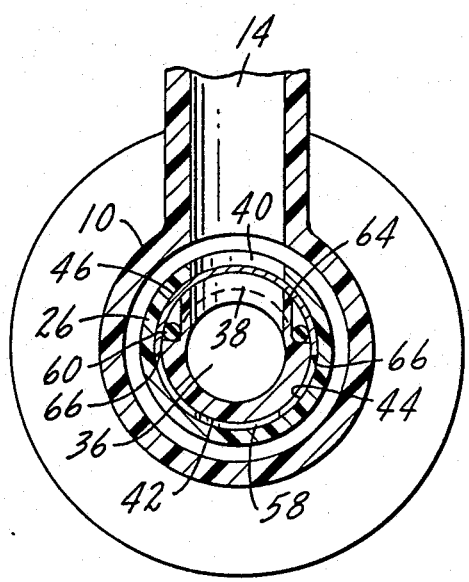
FIG. 3 is a section along plane 3—3 of FIG. 2.

In the valve of FIGS. 1-3, there is a faucet housing or fitting 10 having an inlet 12 and an outlet or discharge 14. The structure of FIGS. 1-3 is for a two lever faucet and the discharge 14 will go to a common spout.

Positioned within fitting 10 is a valve structure in the form of a replaceable cartridge which is held within the fitting by a nut 16 threaded to the exterior of the fitting, as at 18. The faucet cartridge 20 has an outwardly-extending projection 22 which is seated upon a shoulder 24 at the upper end of the fitting with nut or collar 16 locking the cartridge within the fitting.

Faucet cartridge 20 includes a generally cylindrical body 26 having a chamber 28 within which is positioned a seal support 30. The seal support is attached by hook-like projections 32 which extend into mating slots in body 26 in the same manner as shown in my U.S. Pat. No. 4,395,018. Adjacent the fastening of the seal support to the valve body there is a seal ring 34 which provides a static seal between the valve cartridge and the interior of the fitting 10. There is a second static seal 35 between the exterior of cartridge 20 and the interior of faucet 10, with seals 34 and 35 preventing leakage from the fitting as contrasted with leakage from the faucet spout.

The seal support 30 has an inlet 36 in communication with fitting inlet 12 and a discharge opening 38, at right angles to the inlet, and in alignment with a similarly sized and shaped discharge opening 40 in body 26. The exterior wall 42 of the sea support and the interior wall 44 of body 26 define a thin annular space within which is movable a thin wall piston 46 which is connected to a stem 48 extending outwardly from the body and having an end 50 formed and adapted to receive a faucet handle. Piston 46 is attached to stem 48 by means of what is known as a double D configuration formed by the in-turned portions 52 of the piston which extend within grooves 54 in an end of stem 48. A static seal 56 positioned within a groove in the stem seals the stem against external leakage.

Piston 46 is rotatable within the described thin chamber and has an opening 58 which can be moved into alignment with the aligned or registered seal support and body outlets 38 and 40. The size of opening 58 will be such as to in no way inhibit or restrict the passage of water flow through the valve.

The valve closing seal is formed by an annular ring 60 positioned within a groove or recess 62 formed peripherally about seal support outlet 38.

The space formed between the exterior of the seal support and the interior of the body has a cross section which is closely similar to the thickness of the thin walled piston 46 so that there is substantial contact between the sides of the piston and the exterior of the seal support and the interior of the body. The seal support and body are made of a very low friction plastic and the piston will be made of a stainless steel so that there is very little frictional resistance to rotation of the piston. However, because there is contact between these elements as described, and because the thickness of the piston is less than the cross sectional area of the valve closing seal 60, it is impossible for seal 60 to be either lifted out of its seat to the point where it could be cut or abraded by the piston or sucked through the valve outlet by water pressure differentials within the valve. The size and configuration of body outlet 40 and seal support outlet 38 are generally the same so that there is no substantial pressure differential when the valve is fully open. Thus, there is no pressure applied to valve closing seal 60, nothing to draw it upwardly from its seat. Further, recess 62 which contains valve closing seal 60 is slightly spaced from seal support outlet 38 providing n area of contact 64 between the seal support and the interior of the piston inside of valve closing seal 60. This effectively isolates seal 60 from the water supply, avoiding the likelihood that sediment, construction debris or the like which may be in the water supply will contact seal 60. The seal is protected in that it is isolated from the passage of water through the valve and is prevented from being removed from the valve by the size of the space in which the adjacent piston moves. Even when the valve is in a full open position and opening 58 of piston 46 is in full register with the seal support and body openings, the seal is prevented from being drawn out of its seat.

As illustrated in FIG. 2, piston opening 58 may have laterally extending notches 66 which are useful for reducing noise as the valve is opened and closed.

Figure 4:
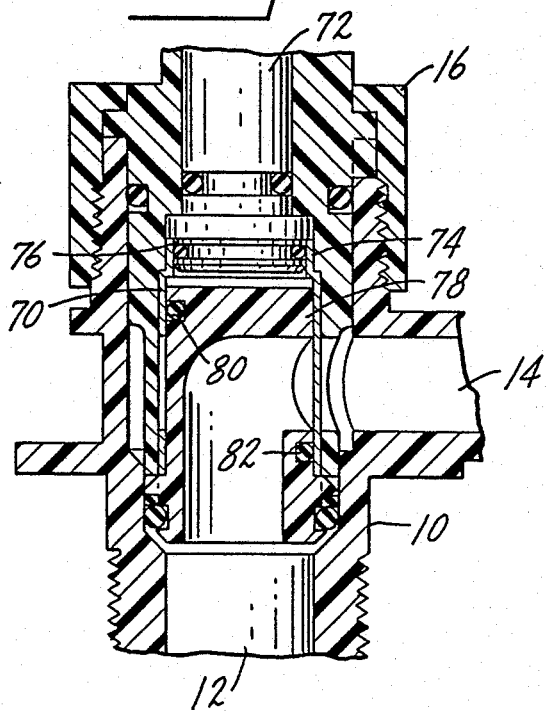
FIG. 4 is an axial section, similar to FIG. 1, but showing a modified form of the invention.

FIG. 4 illustrates a modified valve construction in which piston 70 has a cylindrical portion 74 which is staked or dimpled to a mating cylindrical portion 76 of stem 72. In the valve of FIG. 4 the seal support 78, rather than having a valve closing seal directly adjacent the seal support outlet has a diagonal recess 80 within which is positioned a diagonal O-ring or seal ring 82. Diagonal O-rings such as shown in FIG. 4 are illustrated in my U.S. Pat. No. Re. 25,920. The valve closing seal 82 does in fact extend about the seal support outlet, but is spaced further from the outlet, thus providing additional protection from water impurities while continuing to provide all of the valve closing seal functions of the valve shown in FIGS. 1-3.

FIGS. 5 and 6 illustrate the valving concepts disclosed herein as applied to a mixing valve. The valve fitting 90 has a spout 92 and hot and cold water inlet 94 and 96 extending into a chamber 98 within which is positioned a mixing valve cartridge 100. Cartridge 100 includes an outer sleeve or body 102 and a stem 104 to which is attached an operating handle having a lever or knob (not shown).

Positioned within body 102 of cartridge 100 is a seal support 110 which is similar to seal support 30 of the FIGS. 1-3 embodiment except that it has a hot water inlet 112 and a cold water inlet 114 with the inlets being connected through passages within the seal support to a hot water outlet 116 and a cold water outlet 118. The outlets 116 and 118 face body outlets 120 and 122 which, as in the other forms of the invention, have substantially the same size and configuration as the seal support outlets so that there is no substantial pressure differential when water passes from one to the other.

There is a chamber 124 within body 102 within which a piston 126 both rotates and reciprocates to control the volume and temperature of water discharged from the cartridge. Piston 126 has a thin wall construction 128, as in the FIGS. 1-3 embodiment, with the thin wall 128 moving between and in substantial contact with the exterior of seal support 110 and the interior wall of body 102. The piston has a vent opening 127 to facilitate movement within chamber 124. Seal support 110 has a pair of valve closing seals 130, each positioned within a recess 132 which are in contact with the interior of the piston and function in the same manner as the valve closing seals in the other embodiments of the invention.

Piston 126 has an arcuate-shaped opening 134 which is of a sufficient arcuate extent to provide for water flow from either or both of the seal support discharges 116 and 118. Thus, the rotary position of piston 126 controls the mixture or temperature of water flowing outwardly from the valve cartridge and the axial position of the piston controls the volume of water being discharged from the cartridge openings. Water discharged from body outlets 120 and 122 flows into an annular chamber 136 which is a part of fitting 90 and is in communication with spout 92 through an opening 138. Water flowing from the valve cartridge will flow into the annular chamber 136 and from there into the spout, as is conventional.

In an alternate embodiment the outlet ports from seal support 110 may be axially offset, in which case piston 126 would have separate hot and cold water outlets with a tapered configuration to improve temperature modulation.

Stem 104 includes a stem driver 140 connected to a thin solid rod 142 which is connected to piston 126, the combination of the stem driver, the thin rod and the piston functioning as a valve stem to control the volume and temperature of water discharged from the cartridge. The stem is pressure unbalanced with the degree of unbalance being determined by the cross sectional area of rod 142. The water pressures which are directed upon the piston in the open position differ only in the cross sectional area of thin rod 142. In the closed position of the piston it is not subjected to water pressure because of the described valve closing seals.

Positioned within a cylindrical portion 144 of body 102 is a cage 146 which is hooked or attached to body 102, as at 148, and at its lower end mounts a seal ring 150 through which passes thin rod 142. Details of the cage, stem and seal are shown in the above-mentioned copending application Ser. No. 109,999.

Cage 146, which may conveniently be formed in two identical halves for ease of construction and installation, has a hollow interior 152 within which the stem driver 140 moves. There is a passage 154 which accomodates thin rod 142. Because the friction between rod 142 and seal 150 provides essentially the only resistance to valve stem movement, additional resistance may be required for effective control. The stem control cage has a pair of inwardly-facing flatted surfaces which will cooperate with mating surfaces on the stem driver to provide a friction brake resisting movement of the stem relative to the body. The flatted surfaces on the stem control cage are formed as a part of inwardly-directed portions 156 which ride within recesses 158 in the stem driver, which recesses thus form the friction surfaces as described.

In the event that the friction developed between surfaces on the cage and stem driver is inadequate for proper control of stem movement, in some applications of the valve the relative sizes of the opening in cage 146 and thin rod 142 may be controlled to the point where there is a degree of friction therebetween which may either be used in place of or auxiliary to the described brake frictional surfaces.

Seal member 150 bears against the inside of body 102 to anchor the seal to the body. The seal has inwardly-directed hook members 160 which may be continuously annular or in sections and which extend into mating grooves 162 in the stem control cage. Thus, the seal not only performs the normal sealing function on both thin rod 142 and the interior of body 102, but it is also effective to hold the two halves of the stem control cage into a unitary structure.

There are stops limiting movement of the stem and thus protecting the thin rod against stress. The stops are formed by cooperating areas on the stem driver and the stem control cage. Inward movement of the stem driver is limited by contact between surface 164 on the stem driver and the opposing surface of the stem control cage. Outward movement is limited by contact between flange 170 of the stem driver and the opposing surface on the inwardly-extending portion 156 of the stem control cage.

In all embodiments of the invention, both single lever mixing faucets and two handle faucets, the valve closing seal is protected both by its position within a recess which is spaced from the path of water flow and by the restriction of the opening to the seal when the valve is in an open position. Further, there are no pressure differentials applied to the valve which would cause it to raise up in its seat or recess.

Whereas the preferred form of the invention has been shown and described herein, it should be realized that there may be many modifications, substitutions and alterations thereto.

The embodiments of the invention in which an exclusive property or privilege is claimed are defined as follows:

1. Fluid valve means for use within a valve fixture such as a kitchen faucet, lavatory faucet or shower tub control including a body, a seal support positioned within said body and connected thereto, said seal support having inlet and outlet means, said body having discharge means in alignment with said seal support outlet means, a space defined between an interior wall of said body and an exterior wall of said seal support, a piston movable within said space and being in substantial contact with the interior wall of said body and the exterior wall of said seal support, said piston having an opening movable into alignment with said discharge means and outlet means to provide a water passage from said inlet means to said discharge means, said discharge means and outlet means having a relative size and configuration so as to effect no substantial pressure differential when water flows therethrough, and valve closing seal means extending peripherally about said seal support outlet means and in contact with the interior of said piston.

2. The fluid valve means of claim 1 further characterized by and including an annular recess on the exterior of said seal support, the valve closing seal being positioned within said annular recess.

3. The fluid valve means of claim 2 further characterized in that said recess is spaced about said outlet means, there being contact between said piston and that portion of said seal support exterior inside of said annular recess.

4. The fluid valve means of claim 3 further characterized in that said valve closing seal and recess are uniformly positioned about said seal support outlet means.

5. The fluid valve means of claim 3 further characterized in that said piston is rotatably movable about a valve axis, said valve closing seal and recess being arranged about an axis perpendicular to said valve axis.

6. The fluid valve means of claim 3 further characterized in that said piston is rotatably movable about a valve axis, said valve closing seal and recess being arranged about an axis which forms an angle on the order of about 45 degrees with said valve axis.

7. The fluid valve means of claim 1 further characterized in that said seal support has a single inlet and a single outlet, with said body having a single discharge.

8. The fluid valve means of claim 7 further characterized in that said piston is rotatably movable about a valve axis which is generally coaxial with said single inlet.

9. The fluid valve means of claim 1 further characterized in that said seal support has a pair of inlets and a pair of oppositely disposed outlets, said body having a pair of discharge openings aligned with said seal support outlets.

10. The fluid valve means of claim 9 further characterized in that said piston is movable both axially and rotationally in the space defined between said seal support exterior wall and body interior wall.

11. A fluid mixing valve for use within a valve fixture such as a kitchen faucet, lavatory faucet or shower/tub control including a body, a seal support positioned within said body and mounted thereto, said seal support having a hot water inlet and a cold water inlet and spaced hot and cold water outlets respectively connected thereto, said body having spaced hot and cold water discharges aligned respectively with said seal support hot and cold water outlets, an annular space defined between the interior wall of said body and the exterior of said seal support, a thin wall piston extending about said seal support and being rotatably and axially movable within said space relative to said seal support, said piston being in substantial contact with the interior of said boy and exterior of said seal support and having water opening means communicable with either or both of said seal support outlets to control the flow of water to said body discharges, said outlets and body discharges having a relative size and configuration so as to effect no substantial pressure differential when water flows therethrough, and a valve closing seal extending peripherally about each seal support outlet and in contact with the interior of said piston.

12. The fluid mixing valve of claim 11 further characterized in that said piston water opening means is a single opening of a size and configuration to communicate with either or both of said seal support outlets.

13. The fluid mixing valve of claim 12 further characterized in that said piston opening is unobstructed within its periphery.

14. The fluid mixing valve of claim 11 further characterized by and including an annular recess about each of said seal support outlets, with said valve closing seals each being positioned within an annular recess.

15. The fluid mixing valve of claim 14 further characterized in that each annular recess is spaced about its associated outlet to provide for contact between said piston and that portion of said seal support exterior inside of said annular recess.

16. The fluid mixing valve of claim 11 further characterized by and including a stem attached to said piston, said stem including a stem driver formed and adapted to have an operating handle mounted thereon and a thin rod connected between said stem driver and said piston, said thin rod having a diameter substantially less than the piston outer diameter with said stem being pressure unbalanced with the degree of unbalance being determined by the cross sectional area of said thin rod.

17. The fluid mixing valve of claim 16 further characterized by and including a non-movable seal member positioned within said body and in sealing engagement with the outer periphery of said thin rod.

18. The fluid mixing valve of claim 17 further characterized in that said stem driver is attached to said thin rod on one side of said seal member and said piston being attached to said thin rod on the opposite side of said seal member. thin rod on one side of said seal member and said piston being attached to said thin rod on the opposite side of said seal member.

* * * * *